(12) United States Patent
Yoshida et al.

(10) Patent No.: US 7,123,442 B2
(45) Date of Patent: Oct. 17, 2006

(54) THIN-FILM MAGNETIC HEAD AND MANUFACTURING METHOD OF THIN-FILM MAGNETIC HEAD

(75) Inventors: Makoto Yoshida, Tokyo (JP); Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 876 days.

(21) Appl. No.: 09/899,297

(22) Filed: Jul. 6, 2001

(65) Prior Publication Data

US 2002/0067571 A1 Jun. 6, 2002

(30) Foreign Application Priority Data

Jul. 11, 2000 (JP) .............................. 2000-209912

(51) Int. Cl.
*G11B 5/147* (2006.01)
*G11B 5/31* (2006.01)

(52) U.S. Cl. .................... 360/126; 29/603.13; 428/811

(58) Field of Classification Search ................ 360/126, 360/324.12

See application file for complete search history.

(56) References Cited

U.S. PATENT DOCUMENTS 5,949,627 A * 9/1999 Williams et al. ............ 360/126
6,252,749 B1 * 6/2001 Hayakawa ................... 360/320
6,301,089 B1 * 10/2001 Saito et al. ............ 360/324.12
6,307,720 B1 * 10/2001 Hayakawa ................... 360/313
6,381,094 B1 * 4/2002 Gill ............................ 360/126
6,459,551 B1 * 10/2002 Hayakawa ................... 360/313

FOREIGN PATENT DOCUMENTS

| JP | 62-128011 | 6/1987 |
| JP | 03-162705 | 7/1991 |
| JP | 6-84507 | 12/1994 |
| JP | 09167314 A * | 6/1997 |
| JP | 2000057534 A * | 2/2000 |

* cited by examiner

*Primary Examiner*—Angel Castro
*Assistant Examiner*—Christopher R. Magee
(74) *Attorney, Agent, or Firm*—Buchanan Ingersoll & Rooney PC

(57) ABSTRACT

A thin-film magnetic head has an inductive write head element including an upper core layer with a front end section magnetically coupling with an upper magnetic pole, a lower core layer with a front end section magnetically coupling with a lower magnetic pole, a coil conductor formed to pass between the upper core layer and the lower core layer, and an coil insulation layer for sandwiching the coil conductor. At least one thermal diffusion layer with a good thermal conductivity is formed on the coil insulation layer at an outside region of the upper core layer, or at least one thermal diffusion layer is formed at an outside region of the upper core layer to contact with a part of the coil conductor or to constitute a part of the coil conductor.

10 Claims, 15 Drawing Sheets

THIN-FILM MAGNETIC HEAD AND MANUFACTURING METHOD OF THIN-FILM MAGNETIC HEAD

FIELD OF THE INVENTION

The present invention relates to a thin-film magnetic head provided with at least an inductive write head element and to a manufacturing method of the thin-film magnetic head.

DESCRIPTION OF THE RELATED ART

In a thin-film magnetic head provided with an inductive write head element, a thin-film coil conductor is extremely heated due to a write current flowing there through and thus its environmental temperature is greatly increased. However, in conventional thin-film magnetic heads, no effective countermeasure is taken against the rise in temperature due to the generated heat of the coil conductor. Most of the conventional heads only adopt a heat-radiation structure relaying entirely on heat conduction of the insulation material surrounding the coil conductor.

Japanese utility model publication No. 06084507A discloses thermal diffusion layers of BeO or Ag directly laminated on and contacted with an upper magnetic pole layer and a lower magnetic pole layer to restrain increase in temperature of the upper and lower magnetic pole layers.

However, such direct lamination of the metallic layer on the upper and lower magnetic pole layers, although it is made of a non-magnetic metallic material, will have a detrimental effect on the magnetic characteristics of the head, and also will not provide sufficient heat-radiation effect to the upper and lower magnetic pole layers.

If the rise in temperature due to heating of the coil conductor increases in large amount, the insulation layer surrounding the coil conductor will thermally expand and jut toward an air bearing surface (ABS) of the head. This projection of the insulation layer may come into contact with a magnetic medium in operation of the head. Also, because of heating, the coil conductor itself may be disconnected.

Particularly, since a track width of the thin-film magnetic head becomes narrowed and the magnetic head itself becomes downsized to satisfy the requirement for ever increasing data storage capacities and densities in today's magnetic disk drive apparatus, it is very difficult to radiate the generated heat from the thin-film magnetic head. Also, since the space between the magnetic medium surface and the magnetic head is narrowed, occurrence of the projection of the insulation layer becomes significant problem. Furthermore, since there is the tendency to increase the coercive force Hc of the magnetic medium in order to enhance data storage densities and therefore the write current is becoming increasingly larger, heating of the coil conductor presents serious problem.

SUMMARY OF THE INVENTION

It is therefore an object of the present invention to provide a thin-film magnetic head and a manufacturing method of the head, whereby thermal expansion toward ABS of the head and disconnection of a coil conductor itself due to heating of the coil conductor can be effectively prevented.

According to the present invention, a thin-film magnetic head has an inductive write head element including an upper core layer with a front end section (end section of ABS side) magnetically coupling with an upper magnetic pole, a lower core layer with a front end section magnetically coupling with a lower magnetic pole, a coil conductor formed to pass between the upper core layer and the lower core layer, and an coil insulation layer for sandwiching the coil conductor. Particularly, according to the present invention, at least one thermal diffusion layer with a good thermal conductivity is formed on the coil insulation layer at an outside region of the upper core layer, or at least one thermal diffusion layer is formed at an outside region of the upper core layer to contact with a part of the coil conductor or to constitute a part of the coil conductor.

Since the thermal diffusion layer is formed at the outside region of the upper core layer, heat-radiation effect can be expected without any deleterious effect on the magnetic performance of the inductive write head element. Also, since the thermal diffusion layer expands to cover the outside region of the upper core layer, within which region the most of the coil conductor is located, sufficient heat-radiation effect can be obtained. As a result, not only contact of the magnetic head with a magnetic medium in operation due to the thermal expansion toward the ABS but also disconnection of the coil conductor itself, caused by heating of the coil conductor, can be effectively prevented.

It is preferred that the thermal diffusion layer is formed at a rear (opposite to ABS side) outside region of the upper core layer, and/or that the thermal diffusion layer is formed at a lateral (lateral side seen from ABS) outside region of the upper core layer It is also preferred that only a thin coating film is formed on the thermal diffusion layer to improve heat-radiation performance. In this case, the coating film may be made of a material selected from Ti, Cr, Ta, Ni, Fe, Co, Au, Pt, Rh and Ru, or an alloy containing at least Ti, Cr, Ta, Ni, Fe or Co.

It is preferred that the thermal diffusion layer is made of a material with a thermal conductivity higher than that of $Al_2O_3$ and/or a material with a thermal expansion coefficient lower than that of $Al_2O_3$. The thermal diffusion layer may be made of a material selected from Au, Ag, Si, Zn, Al, Ir, Cd, Sb, W, Ta, Fe, Pb, Ni, Pt, Pd, Mg and Mo, or an alloy containing at least one of Au, Ag, Si, Zn, Al, Ir, Cd, Sb, W, Ta, Fe, Pb, Ni, Pt, Pd, Mg and Mo.

The present invention also concerns to a manufacturing method of a thin-film magnetic head including a step of forming a lower core layer with a front end section magnetically coupling with a lower magnetic pole, a step of forming a first coil insulation layer at least on the lower core layer, a step of forming a coil conductor on the first coil insulation layer, having a pattern to pass on the lower core layer, a step of forming a second coil insulation layer on the coil conductor, and a step of forming an upper core layer with a front end section magnetically coupling with an upper magnetic pole, on the second coil insulation layer, or to a manufacturing method of a thin-film magnetic head including a step of forming a lower core layer with a front end section magnetically coupling with a lower magnetic pole, a step of forming a first coil insulation layer at least on the lower core layer, a step of forming a coil conductor on the first coil insulation layer, having a pattern to pass on the lower core layer, a step of forming a second coil insulation layer on the coil conductor, a step of forming a coil conductor on the second coil insulation layer, having a pattern to pass on the lower core layer, a step of forming a third coil insulation layer on the coil conductor, and a step of forming an upper core layer with a front end section magnetically coupling with an upper magnetic pole, on the third coil insulation layer. Particularly, according to the present invention, at least one thermal diffusion layer with a good thermal conductivity is formed on the second coil insulation layer or on the third coil insulation layer at an outside region of the upper core layer.

It is preferred that the method further includes a step of forming bumps on connection terminals to be connected with the coil conductor, and that the thermal diffusion layer is formed in the step of forming the bumps. It is also preferred that the method further includes a step of forming under films for bumps formed on connection terminals to be connected with the coil conductor, and that the thermal diffusion layer is formed in the step of forming the under films. If the thermal diffusion layer is formed in the same forming process of the bumps or the under films for bumps, no additional process is required.

It is further preferred that the thermal diffusion layer is formed at a rear outside region and/or a lateral outside region of the upper core layer.

In a manufacturing method of a thin-film magnetic head according to the present invention, at least one thermal diffusion layer with a good thermal conductivity is formed at an outside region of the upper core layer, so that the thermal diffusion layer is in contact with a part of the coil conductor or constitutes a part of the coil conductor.

In this case, it is preferred that the thermal diffusion layer is formed in the step of forming the coil conductor. If the thermal diffusion layer is formed in the same forming process of the coil conductor, no additional process is required.

It is also preferred that only a thin coating film is formed on the thermal diffusion layer to improve heat-radiation performance. In this case, the coating film may be made of a material selected from Ti, Cr, Ta, Ni, Fe, Co, Au, Pt, Rh and Ru, or an alloy containing at least Ti, Cr, Ta, Ni, Fe or Co.

It is preferred that the thermal diffusion layer is made of a material with a thermal conductivity higher than that of $Al_2O_3$ and/or a material with a thermal expansion coefficient lower than that of $Al_2O_3$. The thermal diffusion layer may be made of a material selected from Au, Ag, Si, Zn, Al, Ir, Cd, Sb, W, Ta, Fe, Pb, Ni, Pt, Pd, Mg and Mo, or an alloy containing at least one of Au, Ag, Si, Zn, Al, Ir, Cd, Sb, W, Ta, Fe, Pb, Ni, Pt, Pd, Mg and Mo.

Further objects and advantages of the present invention will be apparent from the following description of the preferred embodiments of the invention as illustrated in the accompanying drawings.

DESCRIPTION OF THE PREFERRED EMBODIMENTS

Figure 1:
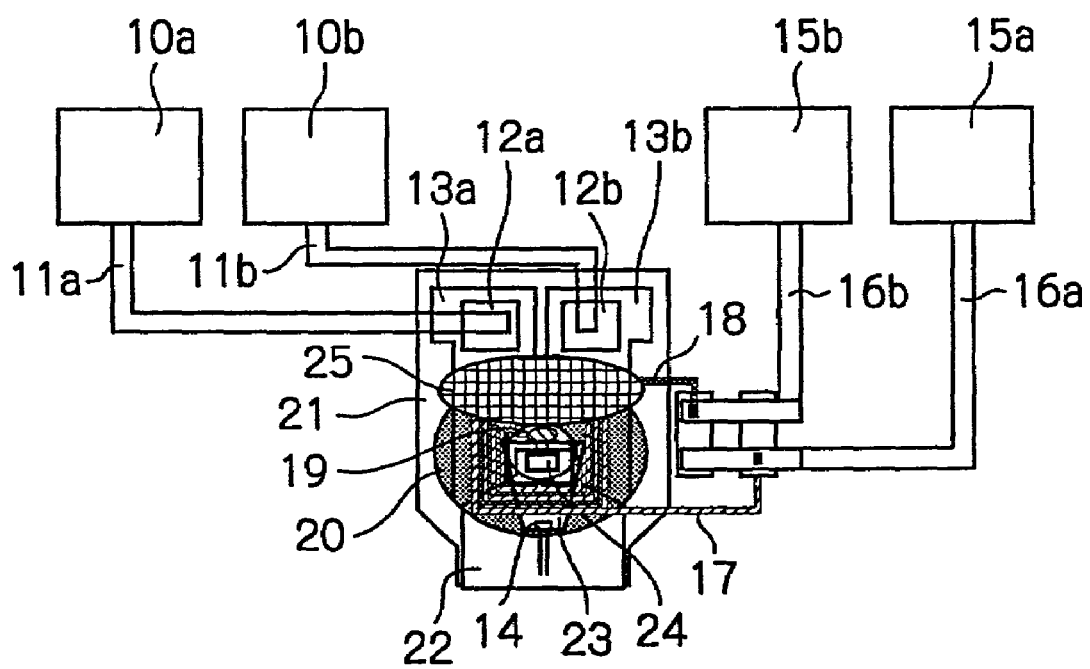
FIG. 1 shows a plane view schematically illustrating a single thin-film magnetic head formed on a wafer surface in a preferred embodiment according to the present invention.

FIG. 1 schematically illustrates a single thin-film magnetic head formed on a wafer surface in a preferred embodiment according to the present invention. In this embodiment, the thin-film magnetic head consists of a composite thin-film magnetic head provided with an inductive write head element and a magnetoresistive effect (MR) read head element.

In the figure, reference numerals 10a and 10b denote connection terminals or pads for the MR read head element, 11a and 11b denote lead conductors for the MR read head element, one ends of which are connected to the respective pads 10a and 10b, 12a and 12b denote contacts for the MR read head element, connected to the other ends of the respective lead conductors 11a and 11b, 13a and 13b denote MR lead electrodes connected to the respective contacts 12a and 12b, 14 denotes an MR film both end portions of which are connected to the respective MR lead electrodes 13a and 13b, 15a and 15b denote connection terminals or pads for the inductive write head element, 16a and 16b denote lead conductors for the inductive write head element, one ends of which are connected to the respective pads 15a and 15b, 17 denotes a first layer coil conductor, one end of which is connected to the other end of the lead conductor 16a, 18 denotes a second layer coil conductor, one end of which is connected to the other end of the lead conductor 16b, 19 denotes a coil connection part for connecting the first layer coil conductor 17 and the second layer coil conductor 18 with each other, 20 denotes a coil insulation layer (a first coil insulation layer 20a, a second coil insulation layer 20b and a third coil insulation layer 20c) surrounding the first and second layer coil conductors 17 and 18, 21 denotes a lower shield layer, 22 denotes an upper shield layer doubling as a lower core layer (a first upper shield layer 22a and a second upper shield layer doubling as a lower core layer 22b), 23 denotes an upper core layer, 24 denotes a back gap part for magnetically connecting the lower core layer 22 and the upper core layer 23 in order to form a magnetic path, and 25 denotes a thermal diffusion layer laminated on the coil insulation layer 20 at the rear (opposite to ABS side) outside region of the upper core layer 23, respectively.

FIGS. 2a to 2g schematically illustrate an example of manufacturing processes of the thin-film magnetic head in this embodiment, and FIGS. 3a to 3g illustrate sections along an A—A line of FIGS. 2a to 2g, respectively. Hereinafter, the manufacturing processes of the thin-film magnetic head in this embodiment will be described with reference to these figures.

Figure 2A:
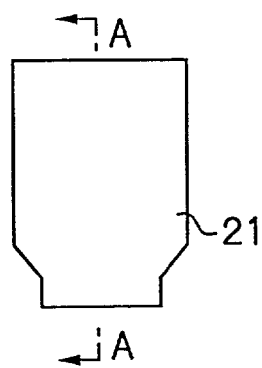
FIGS. 2a to 2g show plane views schematically illustrating an example of manufacturing processes of the thin-film magnetic head in the embodiment of FIG. 1.
Figure 3A:
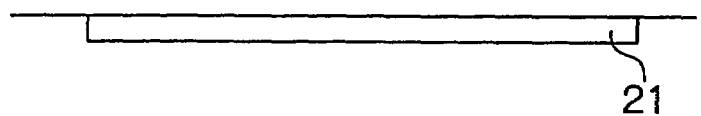
FIGS. 3a to 3g show sectional views along an A—A line of FIGS. 2a to 2g, respectively.

First, an under film and other necessary film are deposited on a wafer. Next, as shown in FIGS. 2a and 3a, the lower shield layer 21 is formed on the under film, an insulation layer is deposited thereon, and then its surface is flattened by executing chemical mechanical polishing (CMP).

Figure 2B:
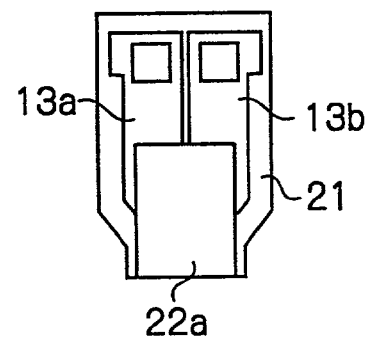
Figure 3B:
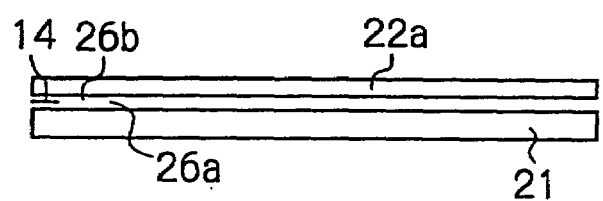

Then, as shown in FIGS. 2b and 3b, a first read gap layer 26a is formed thereon, the MR film 14 and the MR lead electrodes 13a and 13b are formed, a second read gap layer 26b is formed thereon, and thereafter the first upper shield layer 22a is formed thereon.

Figure 2C:
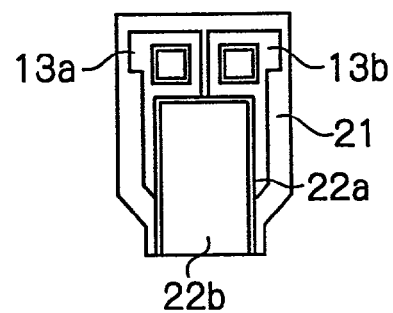
Figure 3C:
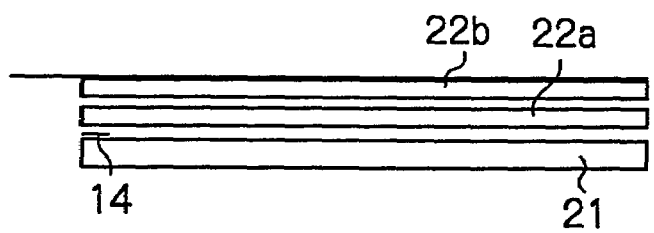

Then, as shown in FIGS. 2c and 3c, the second upper shield layer doubling as the lower core layer 22b is formed on the first upper shield layer 22a, an insulation layer is deposited thereon, and then its surface is flattened by executing CMP.

Figure 2D:
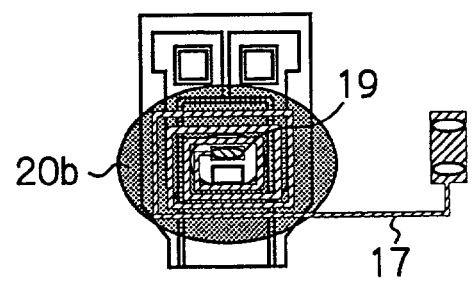
Figure 3D:
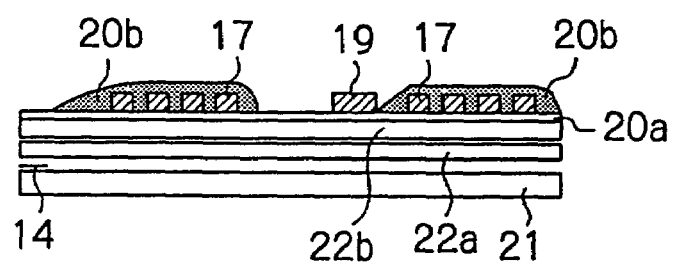

Thereafter, as shown in FIGS. 2d and 3d, the first coil insulation layer 20a is deposited, the first layer coil conductor 17 and the coil connection part 19 are formed thereon, and then the second coil insulation layer 20b is formed to cover the first layer coil conductor 17.

Figure 2E:
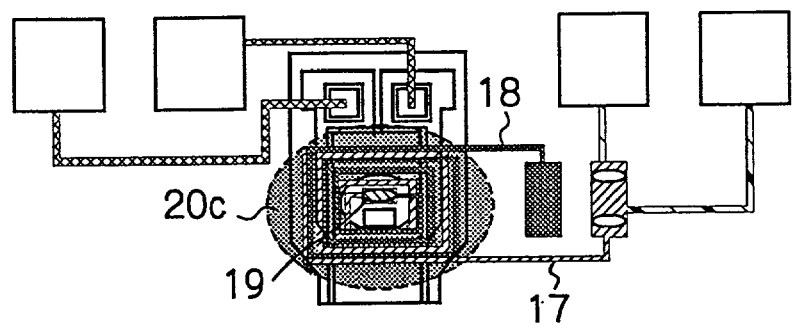
Figure 3E:
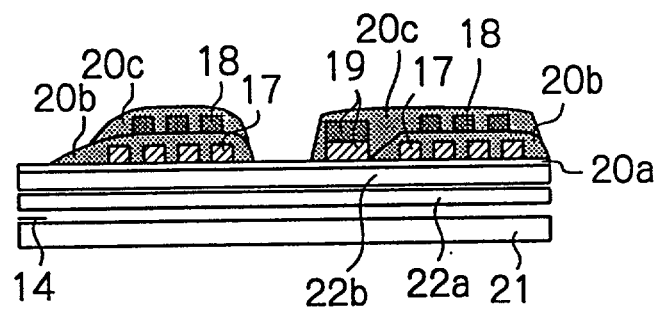

Then, as shown in FIGS. 2e and 3e, the second layer coil conductor 18 and the coil connection part 19 are formed on the second coil insulation layer 20b, and the third coil insulation layer 20c is formed thereon. The pads 10a, 10b, 15a and 15b and the lead conductors 11a, 11b, 16a and 16b are formed in this stage.

Figure 2F:
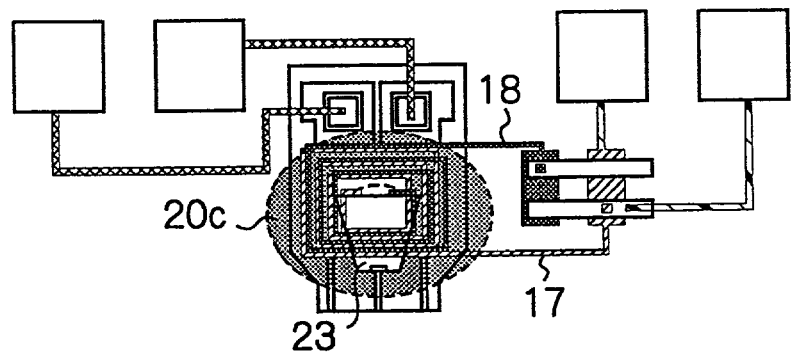
Figure 3F:
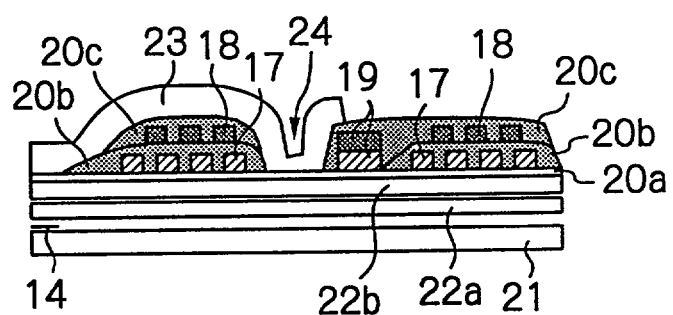

Then, as shown in FIGS. 2f and 3f, the upper core layer 23 is formed on the third coil insulation layer 20c at its front side (ABS side) region.

Figure 2G:
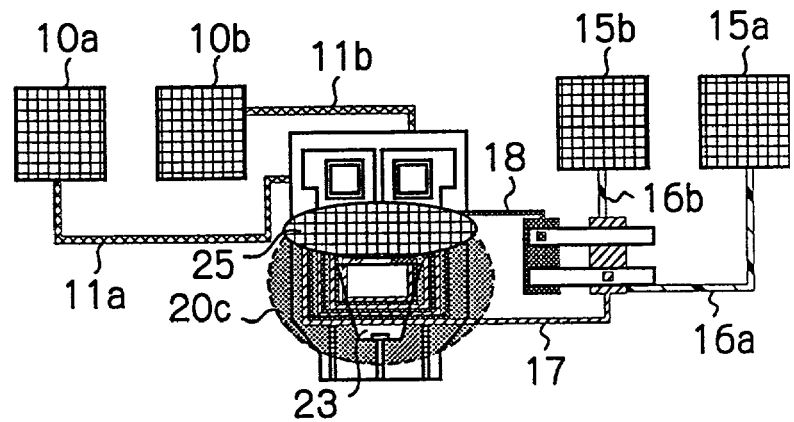
Figure 3G:
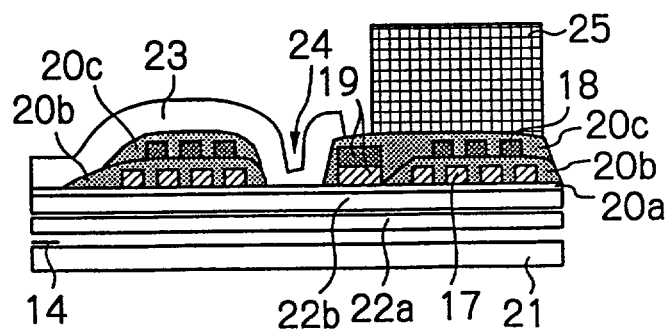

Thereafter, as shown in FIGS. 2g and 3g, under films for bumps are formed on the pads 10a, 10b, 15a and 15b, and then bumps are formed on the under films. In the same process of forming the bumps, the thermal diffusion layer 25 is formed on the third coil insulation layer 20c at the rear (opposite to ABS side) outside region of the upper core layer 23.

The thermal diffusion layer 25 is made of a material with a higher thermal conductivity than that of a protection layer of $Al_2O_3$. Preferably, the thermal diffusion layer 25 is made of the same material as the bumps such as Cu for example in order to simplify the manufacturing process. However, as for the thermal diffusion layer 25, any material selected from Au, Ag, Si, Zn, Al, Ir, Cd, Sb, W, Ta, Fe, Pb, Ni, Pt, Pd, Mg and Mo or an alloy containing at least one of these materials can be used. It is also preferred to use as the thermal diffusion layer 25 a material with a lower thermal expansion coefficient than that of a protection layer of $Al_2O_3$.

Although it is not shown in the figures, thereafter, the protection layer such as $Al_2O_3$ is formed on the upper core layer 23 and the thermal diffusion layer 25. If no protection layer is formed but only a thin coating film is formed on the thermal diffusion layer 25, the heat-radiation effect will be more improved. This coating film will be made of a material selected from Ti, Cr, Ta, Ni, Fe, Co, Au, Pt, Rh and Ru or an alloy containing at least Ti, Cr, Ta, Ni, Fe or Co.

As aforementioned, according to this embodiment, since the thermal diffusion layer 25 is formed on the third coil insulation layer 20c at the rear outside region of the upper core layer 23, heat-radiation effect can be expected without any deleterious effect on the magnetic performance of the inductive write head element. Also, since the thermal diffusion layer 25 expands to cover the outside region of the upper core layer 23, within which region the most of the coil conductors 17 and 18 are located, sufficient heat-radiation effect can be obtained. As a result, not only contact of the magnetic head with a magnetic medium in operation due to the heat expansion toward the ABS but also disconnection of the coil conductors 17 and 18 themselves, caused by heating of the coil conductors 17 and 18, can be effectively prevented.

Furthermore, according to this embodiment, the thermal diffusion layer 25 is formed in the same forming process of the bumps, no additional process is required. Also, as the thermal diffusion layer 25 can be made thick as well as the bumps, greater thermal radiation and thermal storage effect can be expected.

It should be noted that each layer except for the thermal diffusion layer 25, the protection layer and the coating film can be made of any material generally used in this technical field, and can be formed (deposited, patterned) by using any method known in this field.

Although in this embodiment the upper shield layer doubling as the lower core layer 22 is formed in the two layer structure of the first upper shield layer 22a and the second upper shield layer doubling as the lower core layer 22b, it is possible to form it in a single layer structure. In this embodiment the coil conductor is formed also in the two layer structure of the first layer coil conductor 17 and the second layer coil conductor 18. Nevertheless, the coil conductor may be formed in a multilayer structure of more than two layers or in a single layer structure.

FIGS. 4a to 4g schematically illustrate another example of manufacturing processes of a thin-film magnetic head in a modification of the embodiment of FIG. 1, and FIGS. 5a to 5g illustrate sections along an A—A line of FIGS. 4a to 4g respectively. Hereinafter, the manufacturing processes of the thin-film magnetic head in this modification will be described with reference to these figures. In the modification of FIGS. 4a to 4g and FIGS. 5a to 5g, the same elements as these in the embodiment of FIG. 1, FIGS. 2a to 2g and FIGS. 3a to 3g use the same reference numerals, respectively.

Figure 4A:
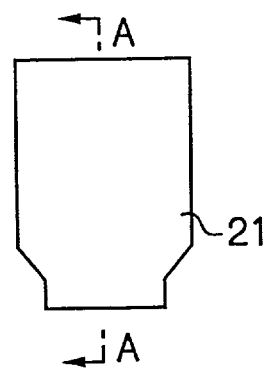
FIGS. 4a to 4g show plane views schematically illustrating another example of manufacturing processes of a thin-film magnetic head in a modification of the embodiment of FIG. 1.
Figure 5A:
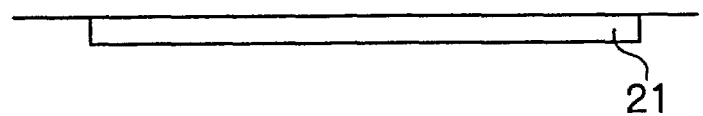
FIGS. 5a to 5g show sectional views along an A—A line of FIGS. 4a to 4g, respectively.

First, an under film and other necessary film are deposited on a wafer. Next, as shown in FIGS. 4a and 5a, the lower shield layer 21 is formed on the under film, an insulation layer is deposited thereon, and then its surface is flattened by executing CMP.

Figure 4B:
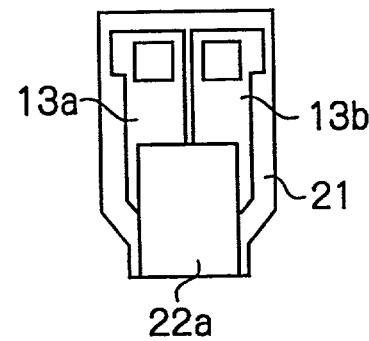
Figure 5B:
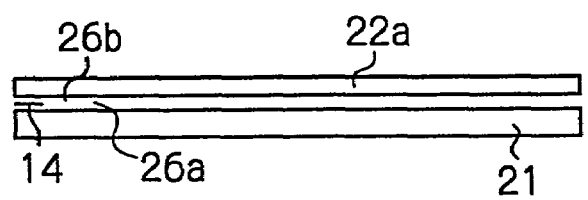

Then, as shown in FIGS. 4b and 5b, a first read gap layer 26a is formed thereon, the MR film 14 and the MR lead electrodes 13a and 13b are formed, a second read gap layer 26b is formed thereon, and thereafter the first upper shield layer 22a is formed thereon.

Figure 4C:
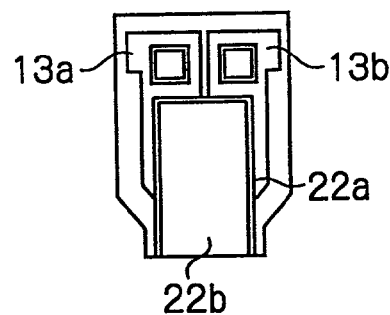
Figure 5C:
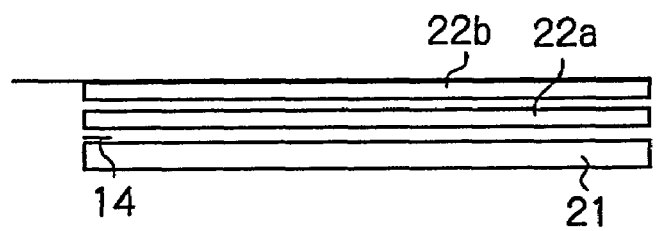

Then, as shown in FIGS. 4c and 5c, the second upper shield layer doubling as the lower core layer 22b is formed on the first upper shield layer 22a, an insulation layer is deposited thereon, and then its surface is flattened by executing CMP.

Figure 4D:
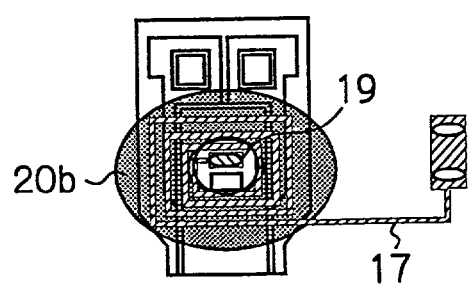
Figure 5D:
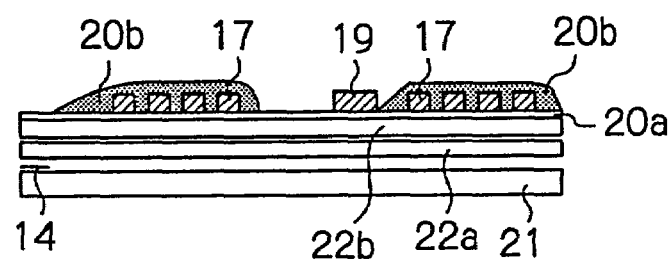

Thereafter, as shown in FIGS. 4d and 5d, the first coil insulation layer 20a is deposited, the first layer coil conductor 17 and the coil connection part 19 are formed thereon, and then the second coil insulation layer 20b is formed to cover the first layer coil conductor 17.

Figure 4E:
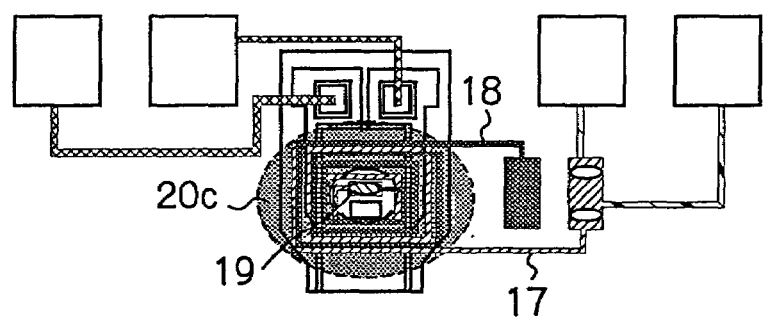
Figure 5E:
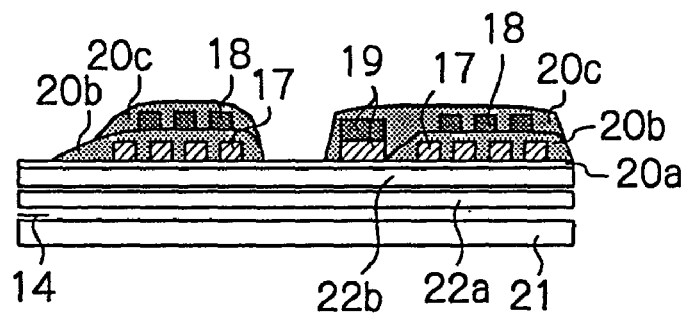

Then, as shown in FIGS. 4e and 5e, the second layer coil conductor 18 and the coil connection part 19 are formed on the second coil insulation layer 20b, and the third coil insulation layer 20c is formed thereon. The pads 10a, 10b, 15a and 15b and the lead conductors 11a, 11b, 16a and 16b are formed in this stage.

Figure 4F:
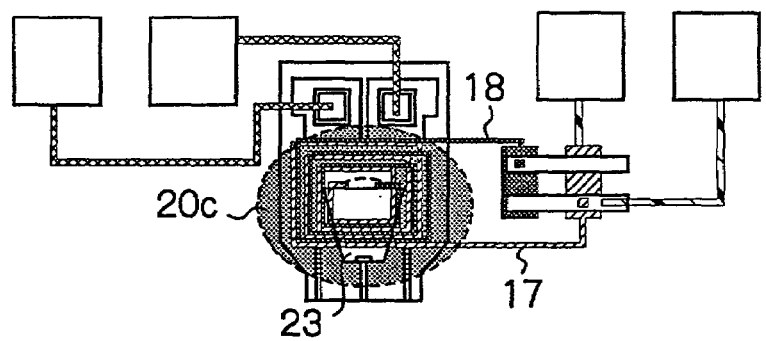
Figure 5F:
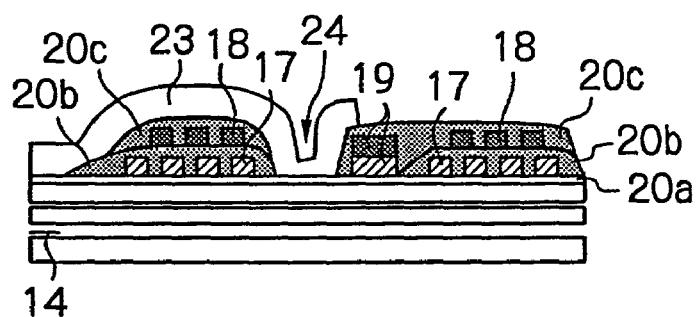

Then, as shown in FIGS. 4f and 5f, the upper core layer 23 is formed on the third coil insulation layer 20c at its front side (ABS side) region.

Figure 4G:
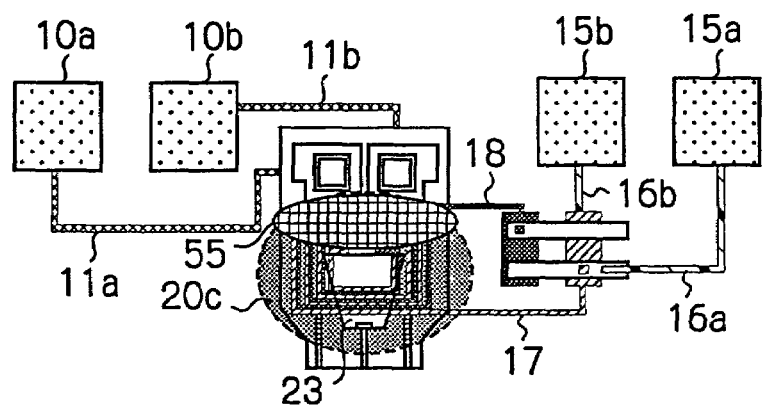
Figure 5G:
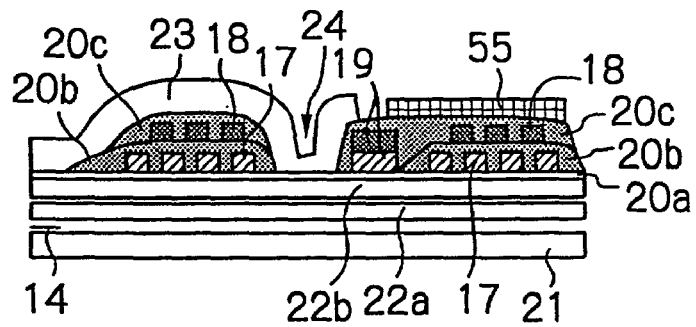

Thereafter, as shown in FIGS. 4g and 5g, under films for bumps are formed on the pads 10a, 10b, 15a and 15b. In the same process of forming the under films for bumps, a thermal diffusion layer 55 is formed on the third coil insulation layer 20c at the rear (opposite to ABS side) outside region of the upper core layer 23. Thus, the thermal diffusion layer 55 in this modification is thinner than the thermal diffusion layer 25 in the embodiment of FIG. 1, FIGS. 2a to 2g and FIGS. 3a to 3g.

The thermal diffusion layer 55 is made of a material with a higher thermal conductivity than that of a protection layer of $Al_2O_3$. Preferably, the thermal diffusion layer 55 is made of the same material as the under films for bumps such as Cu for example in order to simplify the manufacturing process. However, as for the thermal diffusion layer 55, any material selected from Au, Ag, Si, Zn, Al, Ir, Cd, Sb, W, Ta, Fe, Pb, Ni, Pt, Pd, Mg and Mo or an alloy containing at least one of these materials can be used. It is also preferred to use as the thermal diffusion layer 55 a material with a lower thermal expansion coefficient than that of a protection layer of $Al_2O_3$.

Although it is not shown in the figures, thereafter, on the under films formed on the pads 10a, 10b, 15a and 15b, bumps are formed. Then, the protection layer such as $Al_2O_3$ is formed on the upper core layer 23 and the thermal diffusion layer 55. If no protection layer is formed but only a thin coating film is formed on the thermal diffusion layer 55, the heat-radiation effect will be more improved. This coating film will be made of a material selected from Ti, Cr, Ta, Ni, Fe, Co, Au, Pt, Rh and Ru or an alloy containing at least Ti, Cr, Ta, Ni, Fe or Co.

Operations and advantages in this modification are the same as those in the embodiment of FIG. 1, FIGS. 2a to 2g and FIGS. 3a to 3g.

It should be noted that each layer except for the thermal diffusion layer 55, the protection layer and the coating film can be made of any material generally used in this technical field, and can be formed (deposited, patterned) by using any method known in this field.

Although in this modification the upper shield layer doubling as the lower core layer 22 is formed in the two layer structure of the first upper shield layer 22a and the second upper shield layer doubling as the lower core layer 22b, it is possible to form it in a single layer structure. In this modification the coil conductor is formed also in the two layer structure of the first layer coil conductor 17 and the second layer coil conductor 18. Nevertheless, the coil conductor may be formed in a multilayer structure of more than two layers or in a single layer structure.

Figure 6:
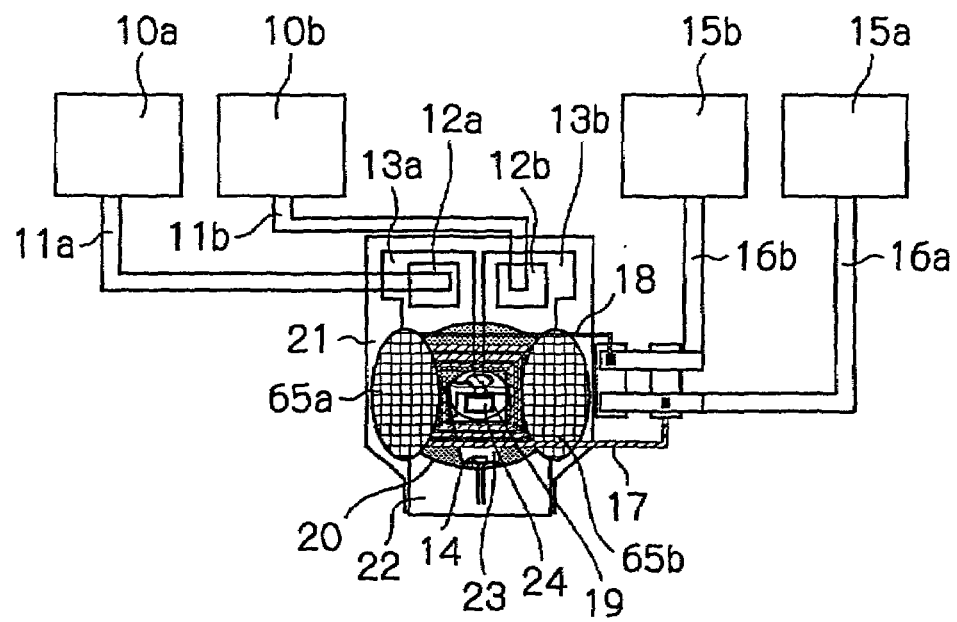
FIG. 6 shows a plane view schematically illustrating a single thin-film magnetic head formed on a wafer surface in another embodiment according to the present invention.

FIG. 6 schematically illustrates a single thin-film magnetic head formed on a wafer surface in another embodiment according to the present invention. In this embodiment, the thin-film magnetic head consists of a composite thin-film magnetic head provided with an inductive write head element and an MR read head element. In the embodiment, the same elements as these in the embodiment of FIG. 1, FIGS. 2a to 2g and FIGS. 3a to 3g use the same reference numerals, respectively.

In the figure, reference numerals 10a and 10b denote connection terminals or pads for the MR read head element, 11a and 11b denote lead conductors for the MR read head element, one ends of which are connected to the respective pads 10a and 10b, 12a and 12b denote contacts for the MR read head element, connected to the other ends of the respective lead conductors 11a and 11b, 13a and 13b denote MR lead electrodes connected to the respective contacts 12a and 12b, 14 denotes an MR film both end portions of which are connected to the respective MR lead electrodes 13a and 13b, 15a and 15b denote connection terminals or pads for the inductive write head element, 16a and 16b denote lead conductors for the inductive write head element, one ends of which are connected to the respective pads 15a and 15b, 17 denotes a first layer coil conductor, one end of which is connected to the other end of the lead conductor 16a, 18 denotes a second layer coil conductor, one end of which is connected to the other end of the lead conductor 16b, 19 denotes a coil connection part for connecting the first layer coil conductor 17 and the second layer coil conductor 18 with each other, 20 denotes a coil insulation layer surrounding the coil conductors 17 and 18, 21 denotes a lower shield layer, 22 denotes an upper shield layer doubling as a lower core layer, 23 denotes an upper core layer, 24 denotes a back gap part for magnetically connecting the lower core layer 22 and the upper core layer 23 in order to form a magnetic path, and 65a and 65b denote thermal diffusion layers laminated on the coil insulation layer 20 at the lateral outside regions of the upper core layer 23, respectively.

The manufacturing processes of the thin-film magnetic head in this embodiment are the substantially same as those shown in FIGS. 2a to 2g and FIGS. 3a to 3g and in FIGS. 4a to 4g and FIGS. 5a to 5g.

In the embodiment, since the thermal diffusion layers 65a and 65b broadly expand to cover the side outside regions of the upper core layer 23, more larger thermal radiation and thermal storage effect can be expected. Other configurations, operations and advantages in this modification are the same as those in the embodiment of FIG. 1, FIGS. 2a to 2g and FIGS. 3a to 3g and in the modification of FIGS. 4a to 4g and FIGS. 5a to 5g.

Figure 7:
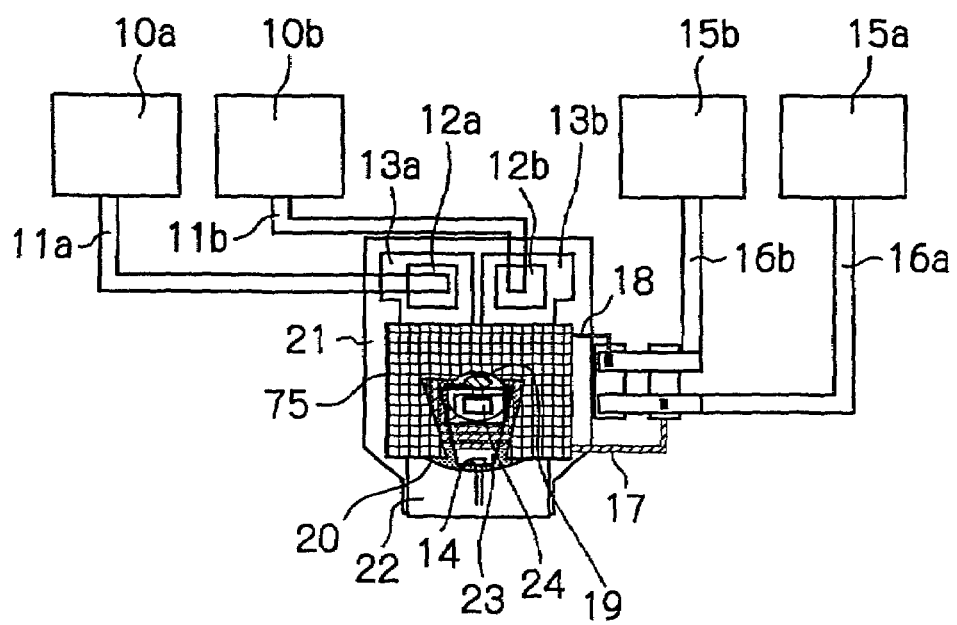
FIG. 7 shows a plane view schematically illustrating a single thin-film magnetic head formed on a wafer surface in a further embodiment according to the present invention.

FIG. 7 schematically illustrates a single thin-film magnetic head formed on a wafer surface in a further embodiment according to the present invention. In this embodiment, the thin-film magnetic head consists of a composite thin-film magnetic head provided with an inductive write head element and an MR read head element. In the embodiment, the same elements as these in the embodiment of FIG. 1, FIGS. 2a to 2g and FIGS. 3a to 3g use the same reference numerals, respectively.

In the figure, reference numerals 10a and 10b denote connection terminals or pads for the MR read head element, 11a and 11b denote lead conductors for the MR read head element, one ends of which are connected to the respective pads 10a and 10b, 12a and 12b denote contacts for the MR read head element, connected to the other ends of the respective lead conductors 11a and 11b, 13a and 13b denote MR lead electrodes connected to the respective contacts 12a and 12b, 14 denotes an MR film both end portions of which are connected to the respective MR lead electrodes 13a and 13b, 15a and 15b denote connection terminals or pads for the inductive write head element, 16a and 16b denote lead conductors for the inductive write head element, one ends of which are connected to the respective pads 15a and 15b, 17 denotes a first layer coil conductor, one end of which is connected to the other end of the lead conductor 16a, 18 denotes a second layer coil conductor, one end of which is connected to the other end of the lead conductor 16b, 19 denotes a coil connection part for connecting the first layer coil conductor 17 and the second layer coil conductor 18 with each other, 20 denotes a coil insulation layer surrounding the coil conductors 17 and 18, 21 denotes a lower shield layer, 22 denotes an upper shield layer doubling as a lower core layer, 23 denotes an upper core layer, 24 denotes a back gap part for magnetically connecting the lower core layer 22 and the upper core layer 23 in order to form a magnetic path, and 75 denotes a thermal diffusion layer laminated on the coil insulation layer 20 at the rear outside region of and the lateral outside regions of the upper core layer 23, respectively.

The manufacturing processes of the thin-film magnetic head in this embodiment are the substantially same as those shown in FIGS. 2a to 2g and FIGS. 3a to 3g and in FIGS. 4a to 4g and FIGS. 5a to 5g.

In the embodiment, since the thermal diffusion layer 75 more broadly expand to cover not only the rear outside region of but also the side outside regions of the upper core layer 23, extremely larger thermal radiation and thermal storage effect can be expected. Other configurations, operations and advantages in this modification are the same as those in the embodiment of FIG. 1, FIGS. 2a to 2g and FIGS. 3a to 3g, in the modification of FIGS. 4a to 4g and FIGS. 5a to 5g, and in the embodiment of FIG. 6.

Figure 8:
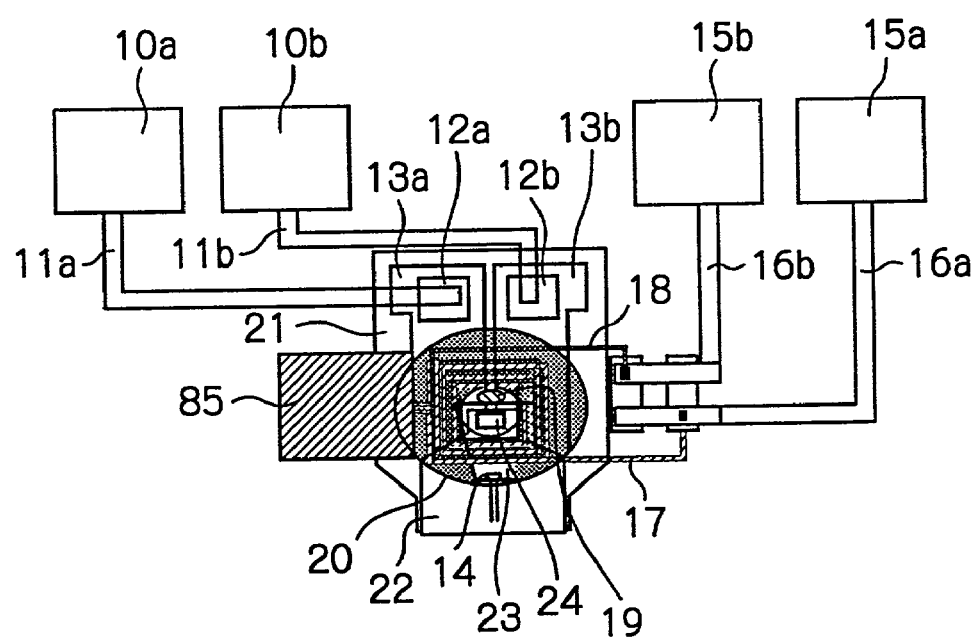
FIG. 8 shows a plane view schematically illustrating a single thin-film magnetic head formed on a wafer surface in a still further embodiment according to the present invention.

FIG. 8 schematically illustrates a single thin-film magnetic head formed on a wafer surface in a still further embodiment according to the present invention. In this embodiment, the thin-film magnetic head consists of a composite thin-film magnetic head provided with an inductive write head element and an MR read head element. In the embodiment, the same elements as these in the embodiment of FIG. 1, FIGS. 2a to 2g and FIGS. 3a to 3g use the same reference numerals, respectively.

In the figure, reference numerals 10a and 10b denote connection terminals or pads for the MR read head element, 11a and 11b denote lead conductors for the MR read head element, one ends of which are connected to the respective pads 10a and 10b, 12a and 12b denote contacts for the MR read head element, connected to the other ends of the respective lead conductors 11a and 11b, 13a and 13b denote MR lead electrodes connected to the respective contacts 12a and 12b, 14 denotes an MR film both end portions of which are connected to the respective MR lead electrodes 13a and 13b, 15a and 15b denote connection terminals or pads for the inductive write head element, 16a and 16b denote lead conductors for the inductive write head element, one ends of which are connected to the respective pads 15a and 15b, 17 denotes a first layer coil conductor, one end of which is connected to the other end of the lead conductor 16a, 18 denotes a second layer coil conductor, one end of which is connected to the other end of the lead conductor 16b, 19 denotes a coil connection part for connecting the first layer coil conductor 17 and the second layer coil conductor 18 with each other, 20 denotes a coil insulation layer (a first coil insulation layer 20a, a second coil insulation layer 20b and a third coil insulation layer 20c) surrounding the first and second layer coil conductors 17 and 18, 21 denotes a lower shield layer, 22 denotes an upper shield layer doubling as a lower core layer (a first upper shield layer 22a and a second upper shield layer doubling as a lower core layer 22b), 23 denotes an upper core layer, 24 denotes a back gap part for magnetically connecting the lower core layer 22 and the upper core layer 23 in order to form a magnetic path, and 85 denotes a thermal diffusion layer laminated on the coil insulation layer 20 at the lateral outside region of the upper core layer 23 so as to directly contact with the first layer coil conductor 17 or to constitute a part of the first layer coil conductor 17, respectively. In modification, the thermal diffusion layer 85 may be formed so as to directly contact with the second layer coil conductor 18 or to constitute a part of the second layer coil conductor 18.

FIGS. 9a to 9g schematically illustrate an example of manufacturing processes of the thin-film magnetic head in this embodiment, and FIGS. 10a to 10g illustrate sections along an A—A line of FIGS. 9a to 9g, respectively. Hereinafter, the manufacturing processes of the thin-film magnetic head in this embodiment will be described with reference to these figures.

Figure 9A:
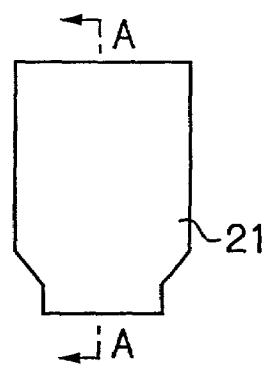
FIGS. 9a to 9g show plane views schematically illustrating an example of manufacturing processes of the thin-film magnetic head in the embodiment of FIG. 8.

First, an under film and other necessary film are deposited on a wafer. Next, as shown in FIGS. 9a and 9a, the lower shield layer 21 is formed on the under film, an insulation layer is deposited thereon, and then its surface is flattened by executing CMP.

Figure 9B:
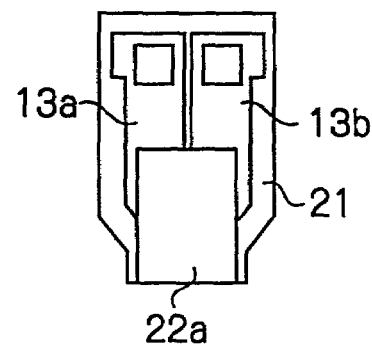
Figure 10A:
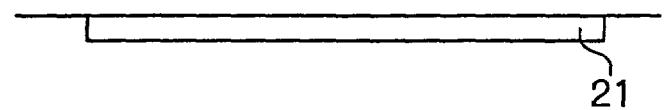
FIGS. 10a to 10g show sectional views along an A—A line of FIGS. 9a to 9g, respectively.
Figure 10B:
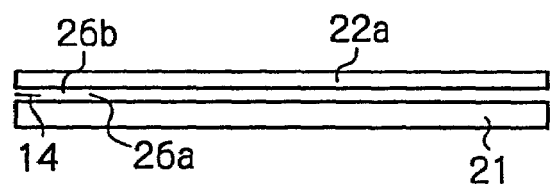

Then, as shown in FIGS. 9b and 10b, a first read gap layer 26a is formed thereon, the MR film 14 and the MR lead electrodes 13a and 13b are formed, a second read gap layer 26b is formed thereon, and thereafter the first upper shield layer 22a is formed thereon.

Figure 9C:
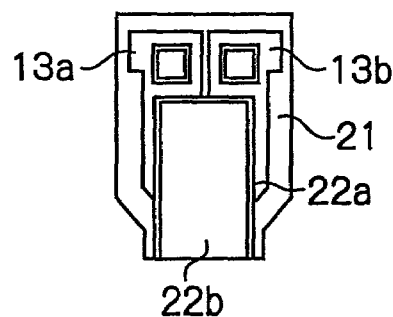
Figure 10C:
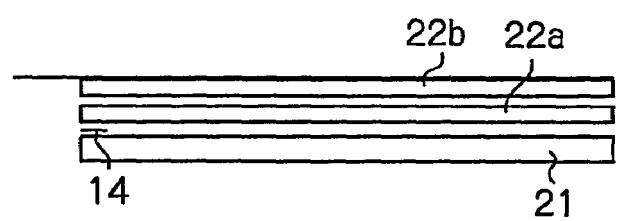

Then, as shown in FIGS. 9c and 10c, the second upper shield layer doubling as the lower core layer 22b is formed on the first upper shield layer 22a, an insulation layer is deposited thereon, and then its surface is flattened by executing CMP.

Figure 9D:
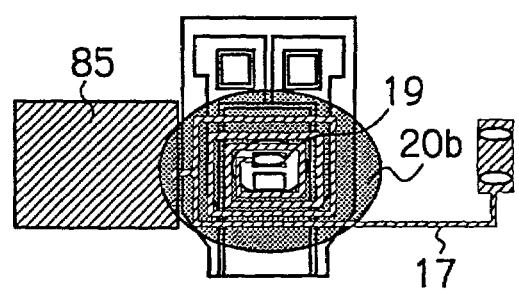
Figure 10D:
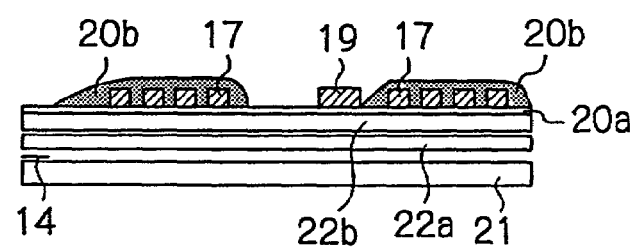

Thereafter, as shown in FIGS. 9d and 10d, the first coil insulation layer 20a is deposited, the first layer coil conductor 17 and the coil connection part 19 are formed thereon. In the same process of forming the first layer coil conductor 17 and the coil connection part 19, the thermal diffusion layer 85 is formed on the first coil insulation layer 20a at the lateral outside region of the upper core layer 23 so as to directly contact with the first layer coil conductor 17 or to constitute a part of the first layer coil conductor 17. Then, the second coil insulation layer 20b is formed to cover the first layer coil conductor 17 and the thermal diffusion layer 85.

The thermal diffusion layer 85 is made of a material with a higher thermal conductivity than that of a protection layer of $Al_2O_3$. Preferably, the thermal diffusion layer 85 is made of the same material as the coil conductor such as Cu for example in order to simplify the manufacturing process. However, as for the thermal diffusion layer 85, any material selected from Au, Ag, Si, Zn, Al, Ir, Cd, Sb, W, Ta, Fe, Pb, Ni, Pt, Pd, Mg and Mo or an alloy containing at least one of these materials can be used. It is also preferred to use as the thermal diffusion layer 85 a material with a lower thermal expansion coefficient than that of a protection layer of $Al_2O_3$.

Figure 9E:
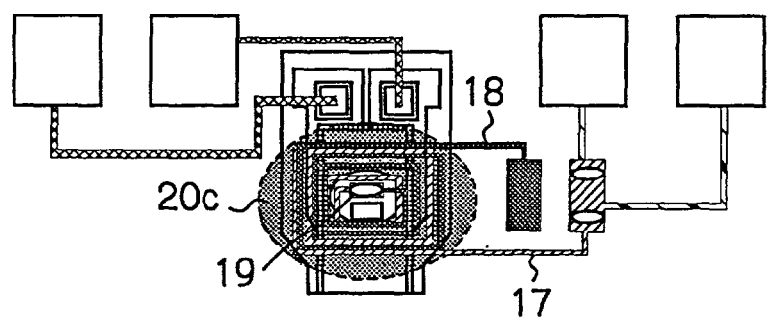
Figure 10E:
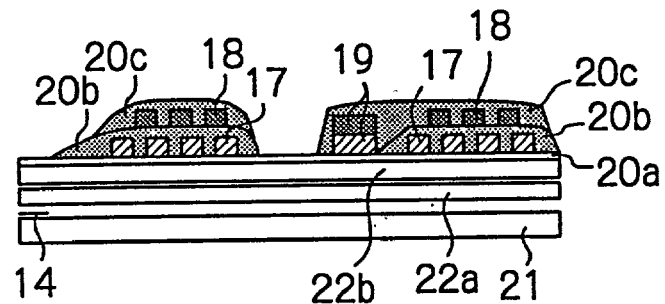

Then, as shown in FIGS. 9e and 10e, the second layer coil conductor 18 and the coil connection part 19 are formed on the second coil insulation layer 20b, and the third coil insulation layer 20c is formed thereon. The pads 10a, 10b, 15a and 15b and the lead conductors 11a, 11b, 16a and 16b are formed in this stage. In the same process of forming the second layer coil conductor 18 and the coil connection part 19, the thermal diffusion layer 85 may be formed at the lateral outside region of the upper core layer 23 so as to directly contact with the second layer coil conductor 18 or to constitute a part of the second layer coil conductor 18. Namely, the thermal diffusion layer 85 may be formed in the same process of forming the first layer coil conductor 17 or in the same process of forming the second layer coil conductor 18. In further modification, one thermal diffusion layer may be formed in the same process of forming the first layer coil conductor 17, and the other thermal diffusion layer may be formed in the same process of forming the second layer coil conductor 18.

Figure 9F:
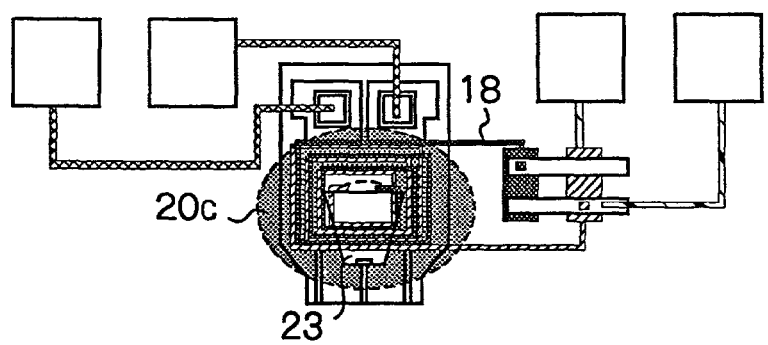
Figure 10F:
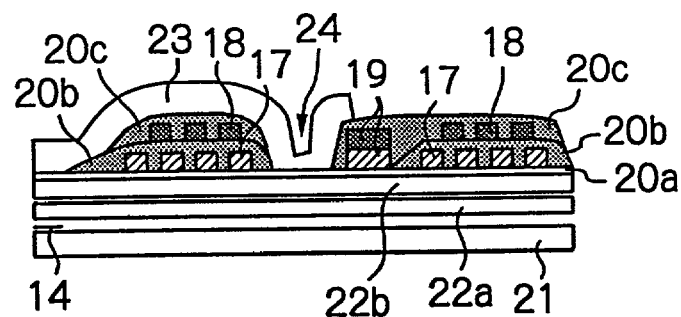

Then, as shown in FIGS. 9f and 10f, the upper core layer 23 is formed on the third coil insulation layer 20c at its front side (ABS side) region.

Figure 9G:
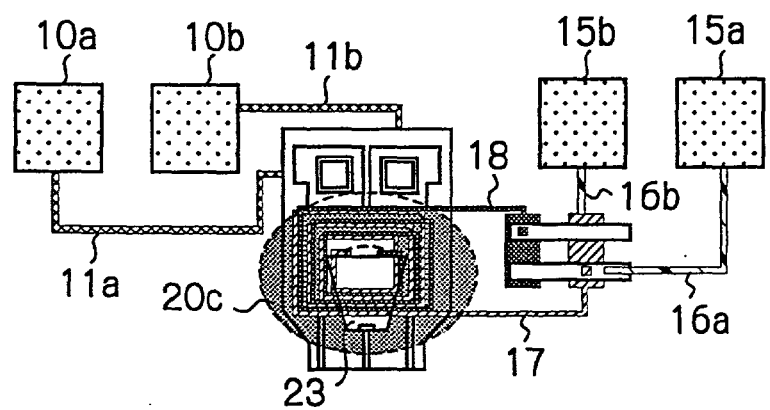
Figure 10G:
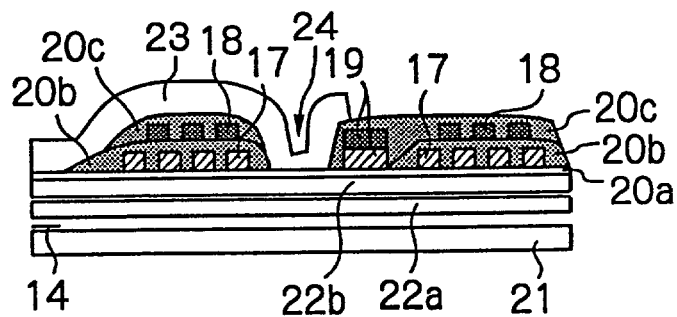

Thereafter, as shown in FIGS. 9g and 10g, under films for bumps are formed on the pads 10a, 10b, 15a and 15b, and then bumps are formed on the under films.

Although it is not shown in the figures, thereafter, the protection layer such as $Al_2O_3$ is formed on the upper core layer 23 and the third coil insulation layer 20c.

As aforementioned, according to this embodiment, since the thermal diffusion layer 85 is formed at the lateral outside region of the upper core layer 23, heat-radiation effect can be expected without any deleterious effect on the magnetic performance of the inductive write head element. Also, since the thermal diffusion layer 85 is formed so as to directly contact with the first and/or second layer coil conductors, or to constitute a part of the first and/or second layer coil conductors, sufficient heat-radiation effect can be obtained. As a result, not only contact of the magnetic head with a magnetic medium in operation due to the heat expansion toward the ABS but also disconnection of the coil conductors 17 and 18 themselves, caused by heating of the coil conductors 17 and 18, can be effectively prevented.

Furthermore, according to this embodiment, the thermal diffusion layer 85 is formed in the same forming process of the coil conductor, no additional process is required.

It should be noted that each layer except for the thermal diffusion layer 85 and the protection layer can be made of any material generally used in this technical field, and can be formed (deposited, patterned) by using any method known in this field.

Although in this embodiment the upper shield layer doubling as the lower core layer 22 is formed in the two layer structure of the first upper shield layer 22a and the second upper shield layer doubling as the lower core layer 22b, it is possible to form it in a single layer structure. In this embodiment the coil conductor is formed also in the two layer structure of the first layer coil conductor 17 and the second layer coil conductor 18. Nevertheless, the coil conductor may be formed in a multilayer structure of more than two layers or in a single layer structure.

It is apparent that the MR read head element in the composite thin-film magnetic head may be an anisotropic magnetoresistive effect (AMR) read head element, a giant magnetoresistive effect (GMR) read head element including both a current in plane (CIP) type GMR element in which current flows along layer planes and a current perpendicular to plane (CPP) type GMR element in which current flows perpendicular to layer planes, or a tunnel magnetoresistive effect (TMR) read head element.

It will be also noted that the present invention is not limited to a composite thin-film magnetic head provided with an inductive write head element and an MR read head element but can be applied to a thin-film magnetic head provided with only an inductive write head element or an inductive read/write head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head comprising:
   an inductive write head element including an upper core layer with a front end section magnetically coupling with an upper magnetic pole, a lower core layer with a front end section magnetically coupling with a lower magnetic pole, a coil conductor formed to pass between said upper core layer and said lower core layer, and a coil insulation layer for sandwiching said coil conductor;
   at least one thermal diffusion layer with a good thermal conductivity in contact with said coil insulation layer at an outside region of said upper core layer, wherein no protection layer is present on the thermal diffusion layer; and
   a thin coating film in contact with said at least one thermal diffusion layer, only said thin coating film being formed on said at least one thermal diffusion layer, said thin coating film being made of a material selected from Ti, Cr, Ta, Ni, Fe, Co, Au, Pt, Rh and Ru, or an alloy containing at least Ti, Cr, Ta, Ni, Fe or Co.

2. The thin-film magnetic head as claimed in claim 1, wherein said at least one thermal diffusion layer is formed at a rear outside region of said upper core layer.

3. The thin-film magnetic head as claimed in claim 1, wherein said at least one thermal diffusion layer is formed at a lateral outside region of said upper core layer.

4. The thin-film magnetic head as claimed in claim 1, wherein said at least one thermal diffusion layer is made of a material with a thermal conductivity higher than that of $Al_2O_3$.

5. The thin-film magnetic head as claimed in claim 1, wherein said at least one thermal diffusion layer is made of a material with a thermal expansion coefficient lower than that of $Al_2O_3$.

6. The thin-film magnetic head as claimed in claim 1, wherein said at least one thermal diffusion layer is made of a material selected from Au, Ag, Si, Zn, Al, Ir, Cd, Sb, W, Ta, Fe, Pb, Ni, Pt, Pd, Mg and Mo, or an alloy containing at least one of Au, Ag, Si, Zn, Al, Ir, Cd, Sb, W, Ta, Fe, Pb, Ni, Pt, Pd, Mg and Mo.

7. A thin-film magnetic head comprising:
   an inductive write head element including an upper core layer with a front end section magnetically coupling with an upper magnetic pole, a lower core layer with a front end section magnetically coupling with a lower magnetic pole, a coil conductor formed to pass between said upper core layer and said lower core layer, and a coil insulation layer for sandwiching said coil conductor;
   at least one thermal diffusion layer with a good thermal conductivity formed at an outside region of said upper core layer, said at least one thermal diffusion layer being in contact with a part of said coil conductor or constituting a part of said coil conductor, wherein no protection layer is present on the thermal diffusion layer; and
   a thin coating film in contact with said at least one thermal diffusion layer, only said thin coating film being formed on said at least one thermal diffusion layer, said thin coating film being made of a material selected from Ti, Cr, Ta, Ni, Fe, Co, Au, Pt, Rh and Ru, or an alloy containing at least Ti, Cr, Ta, Ni, Fe or Co.

8. The thin-film magnetic head as claimed in claim 7, wherein said at least one thermal diffusion layer is made of a material with a thermal conductivity higher than that of $Al_2O_3$.

9. The thin-film magnetic head as claimed in claim 7, wherein said at least one thermal diffusion layer is made of a material with a thermal expansion coefficient lower than that of $Al_2O_3$.

10. The thin-film magnetic head as claimed in claim 7, wherein said at least one thermal diffusion layer is made of a material selected from Au, Ag, Si, Zn, Al, Ir, Cd, Sb, W, Ta, Fe, Pb, Ni, Pt, Pd, Mg and Mo, or an alloy containing at least one of Au, Ag, Si, Zn, Al, Ir, Cd, Sb, W, Ta, Fe, Pb, Ni, Pt, Pd, Mg and Mo.

* * * * *